Feb. 9, 1965 J. R. WILLIAMS 3,168,772
FORM SYSTEM FOR CONCRETE CONSTRUCTION
Filed Oct. 10, 1963 8 Sheets-Sheet 1

INVENTOR.
John R. Williams
BY
Attorneys

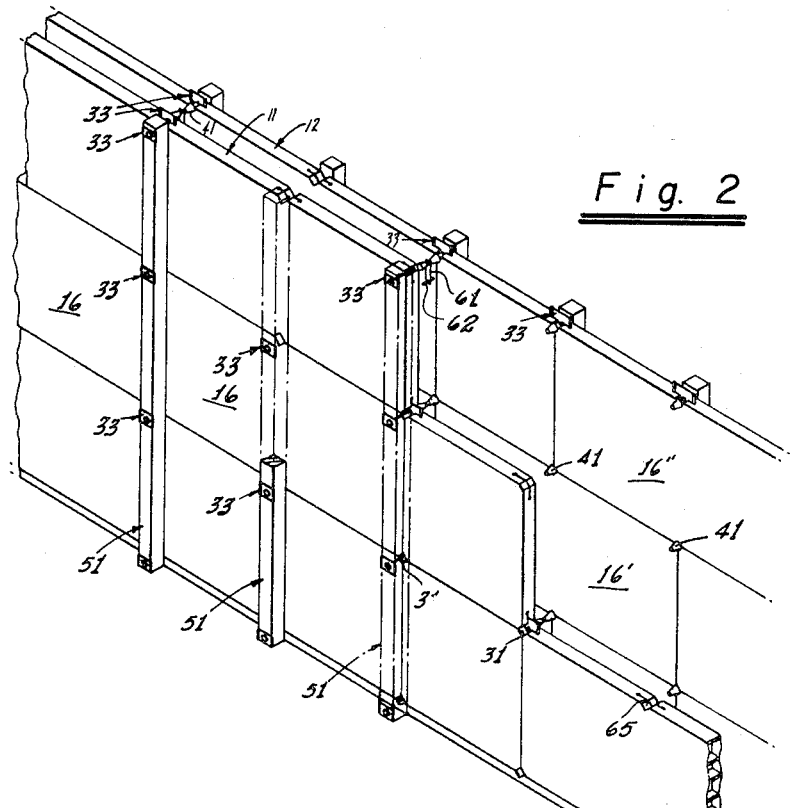
Fig. 2
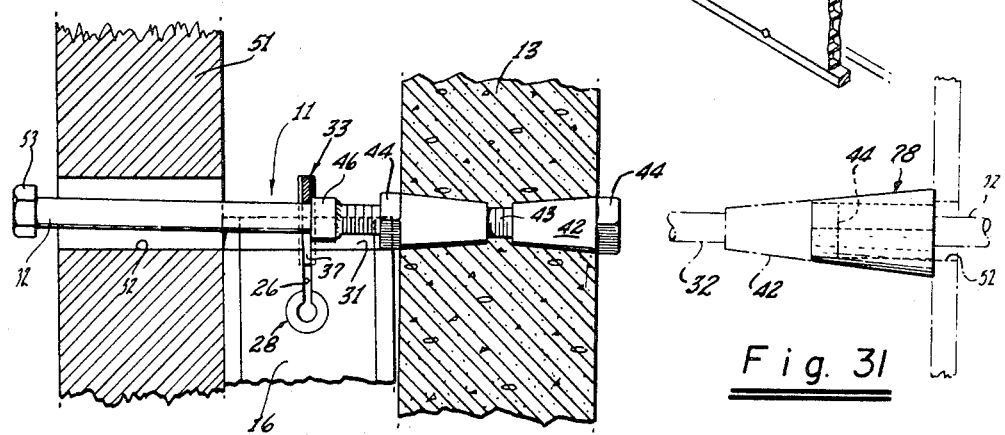
Fig. 3
Fig. 31
INVENTOR.
John R. Williams

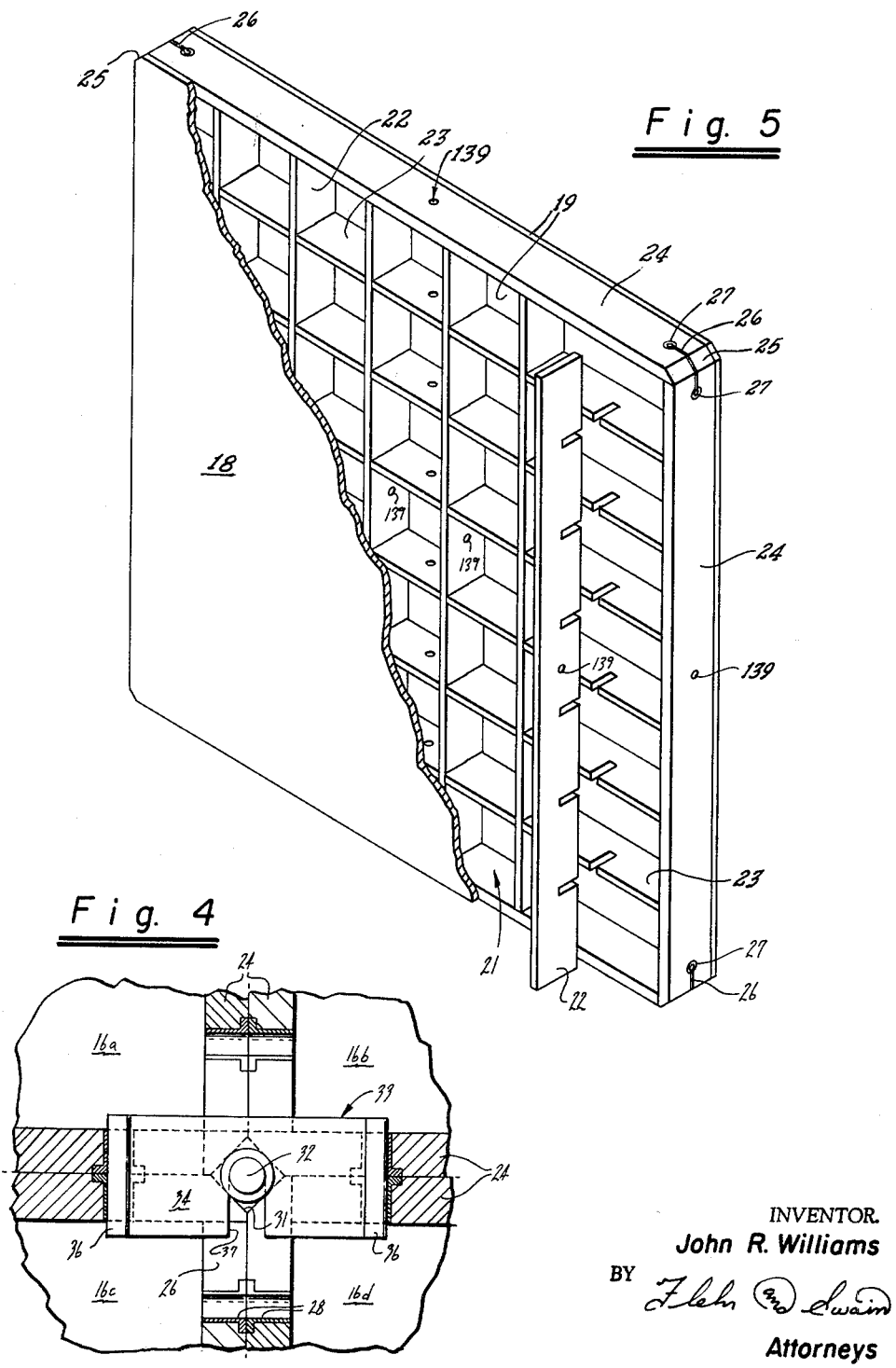

Feb. 9, 1965  J. R. WILLIAMS  3,168,772
FORM SYSTEM FOR CONCRETE CONSTRUCTION
Filed Oct. 10, 1963  8 Sheets-Sheet 4
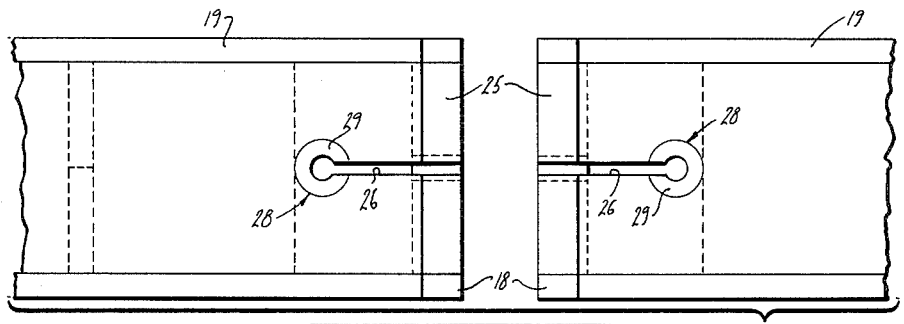
Fig. 6
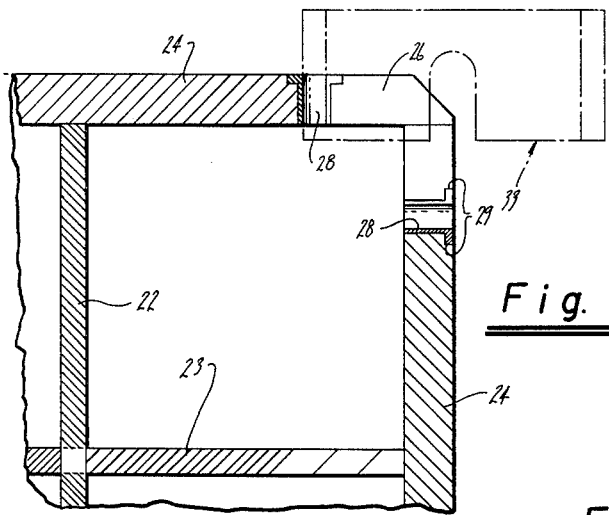
Fig. 7
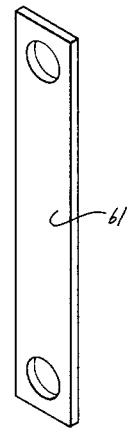
Fig. 8
Fig. 9
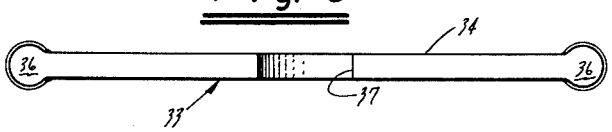
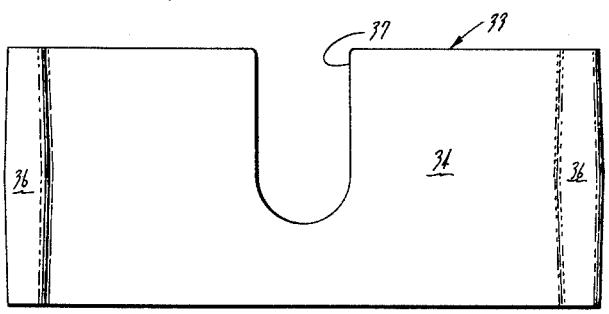
Fig. 10
INVENTOR.
John R. Williams
BY
Attorneys

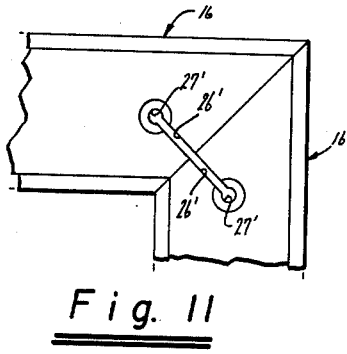
Fig. 11
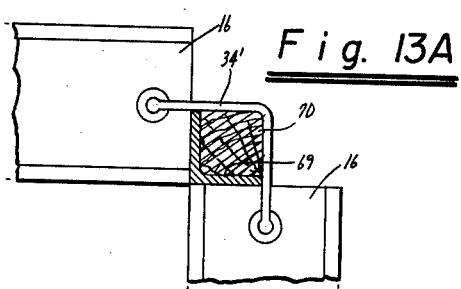
Fig. 13A
Fig. 15
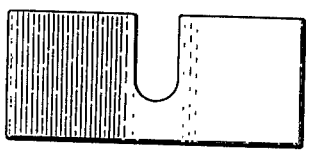
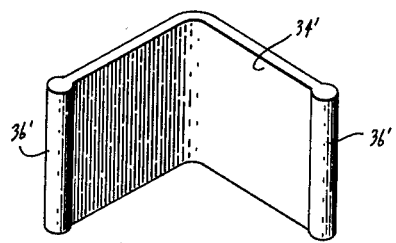
Fig. 12
Fig. 14
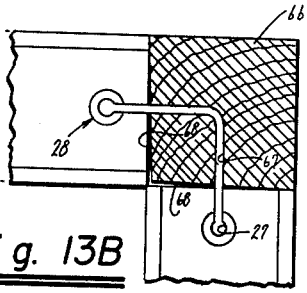
Fig. 13B
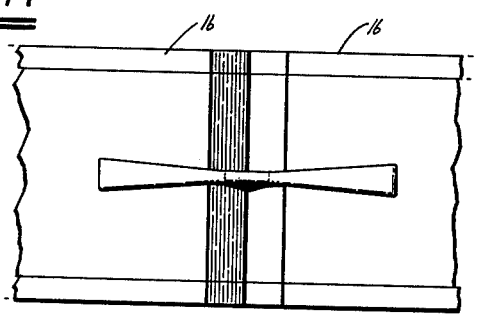
Fig. 16
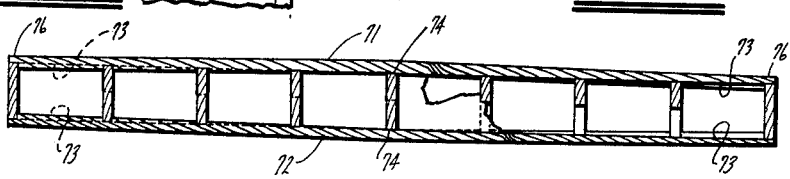
Fig. 18

Feb. 9, 1965    J. R. WILLIAMS    3,168,772
FORM SYSTEM FOR CONCRETE CONSTRUCTION
Filed Oct. 10, 1963    8 Sheets-Sheet 6
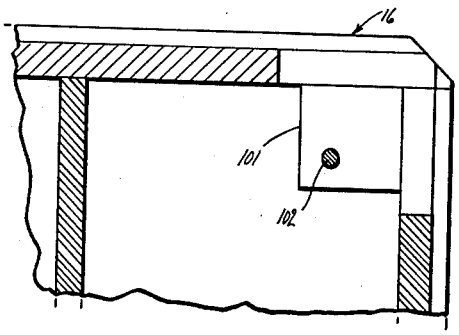
Fig. 23
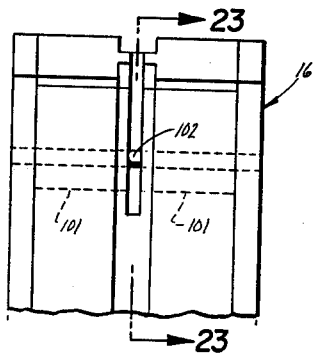
Fig. 24
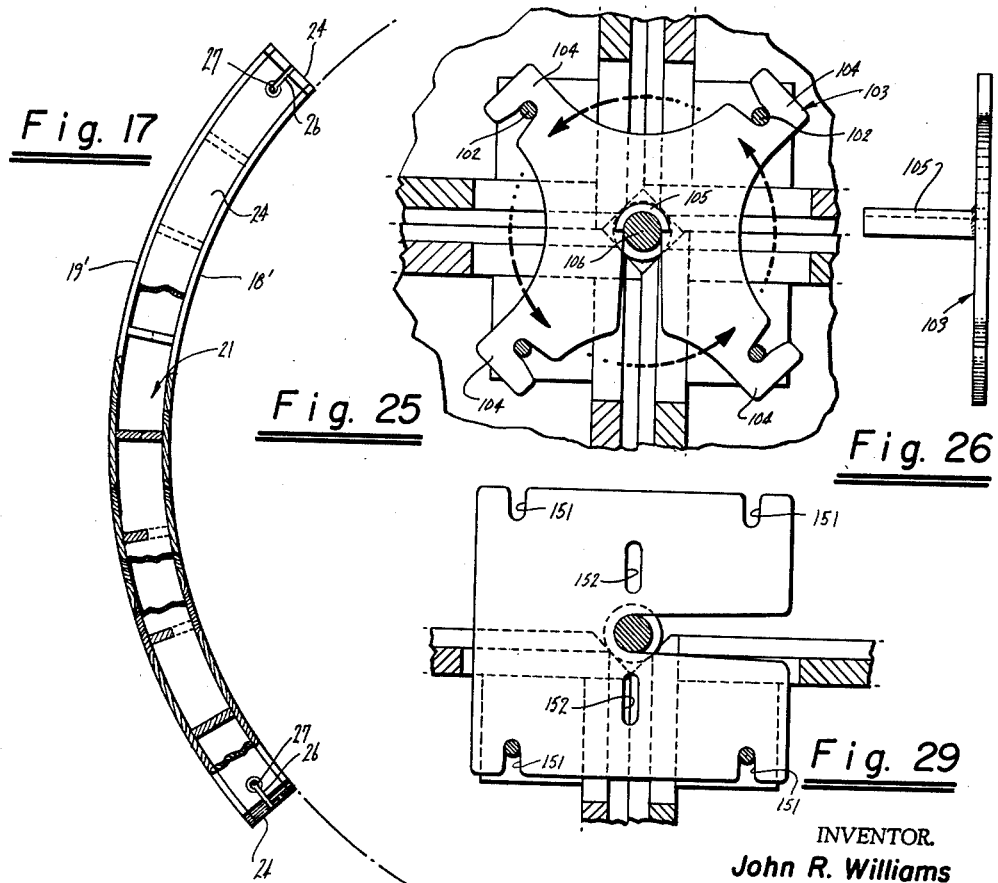
Fig. 17
Fig. 25
Fig. 26
Fig. 29
INVENTOR.
John R. Williams
BY
*Attorneys*

Feb. 9, 1965  J. R. WILLIAMS  3,168,772
FORM SYSTEM FOR CONCRETE CONSTRUCTION
Filed Oct. 10, 1963  8 Sheets-Sheet 8
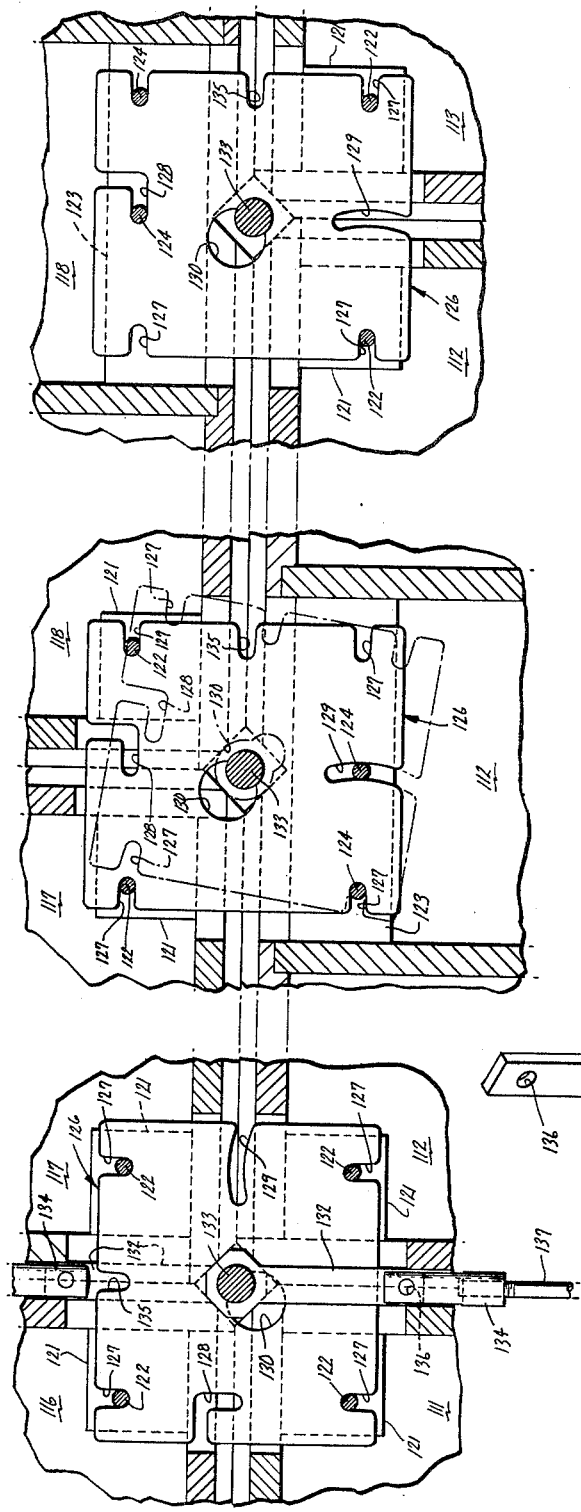
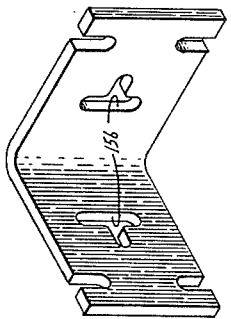
INVENTOR.
John R. Williams
BY
Attorneys United States Patent Office 3,168,772
Patented Feb. 9, 1965

3,168,772
FORM SYSTEM FOR CONCRETE CONSTRUCTION
John R. Williams, Hayward, Calif., assignor to Utah Construction & Mining Co., San Francisco, Calif., a corporation of Delaware
Filed Oct. 10, 1963, Ser. No. 315,172
14 Claims. (Cl. 25—131)

This invention relates generally to a form system for concrete construction and more particularly to a form system employing modular forms. The invention also relates to panels and hardware for use in such systems.

A common method of forming concrete structures is to construct the forms in place. Concrete retaining faces are formed by securing, as for example, by nailing boards or panels to vertical studs, usually 2 x 4's placed on edge. Tie rods are inserted through holes formed in the boards or panels. These tie rods engage horizontal walers which support the back of the studs. The tie rods may engage only the walers whereby to resist outward pressure only, or may include tie rod spacers which engage the opposed faces of the form to resist inward pressure.

Systems of the foregoing type are still in wide usage even though they are costly from both the material and labor standpoint. Each forming job requires that the forms be reconstructed. After the pouring and setting of the concrete, the forms must be stripped. This, in general, requires a complete dismantling of the forms. The holes formed in the faces for insertion of the tie rods and the damage during dismantling and handling results in a large percentage of the lumber being discarded after each job.

To overcome the foregoing, a number of systems have been introduced which employ modular panels secured together by various types of hardware. Often, many different types of hardware as well as tools for using the same are required on a single job. Thus, some of the saving in labor is lost because of the expensive hardware and tools required. The prior art panel systems are not readily usable interchangeably or side by side with conventional forming. Where special forms are required, the construction crew is required to use non-conventional forming to accommodate to the panel system.

Two such systems employ panels having metal frames to which are secured replaceable faces; in one instance, a wood face, and in another, a metal face. In each instance, special hardware is required to secure the panels to one another and to align the same. For example, the aligning may be by means of wood wales which requires special hardware for securing the wales to the steel frames. The facing is provided on only one side because the other side must be used for the hardware. The panels are relatively heavy and difficult to handle. Many different types of hardware are required, causing a serious logistic problem, and continuous attention to assure the proper parts and tools are available.

There has been suggested another form system which includes light-weight, internally braced panels constructed in modular fashion. These panels include a metal raceway for receiving an internal clamping device or fastener. However, in order to insert tie rods and spacers, the panels must be drilled to accommodate the same and secure to the wales as with conventional forming described above. As a result, the panels are reusable only to a limited extent.

In all the various panel systems described above, special tools are required for non-destructively stripping the panels after the concrete has been poured and set up.

It is a general object of the present invention to provide an economical form system for concrete construction.

It is a further object of the present invention to provide a concrete forming system including modular panel construction and associated hardware which can be used with conventional forming.

It is another object of the present invention to provide a concrete form system in which the hardware does not require special tools and a minimum number of types of hardware are required.

It is a further object of the present invention to provide a panel for use in concrete forming systems and the like which may be easily locked to and aligned with other panels to form wall structures.

It is a further object of the present invention to provide a concrete forming system including light-weight, sandwich-type panels.

It is a further object of the present invention to provide a concrete forming system which is easy to assemble and disassemble.

It is another object of the present invention to provide a form system adaptable to gang forming.

It is a further object of the present invention to provide a concrete forming system in which there are provided means for easily stripping the panels from the finished concrete.

It is a further object of the present invention to provide a concrete forming system in which the finished concrete has a relatively smooth finish.

It is a further object of the present invention to provide a concrete forming system in which no particular training is required to adapt construction crews to the use of the same.

It is a further object of the present invention to provide a concrete forming system including panels having internal ties.

It is still a further object of the present invention to provide a concrete forming system which can be easily aligned, braced and erected.

It is a further object of the present invention to provide improved hardware for concrete form systems.

The foregoing and other objects of the invention will become more clearly apparent from the following description when taken in conjunction with the accompanying drawings.

Referring to the drawings:

FIGURE 2 is a perspective view of the forming system assembled for a wall construction;

FIGURE 3 is a partial sectional view showing the stripping operation;

FIGURE 4 is a partial view showing four panels secured at their corners to one another in accordance with the invention;

FIGURE 5 is a perspective view showing a hollow panel suitable for use in the system of the present invention;

FIGURE 6 is a partial top view showing the corner portions of adjacent panels;

FIGURE 7 is an enlarged sectional view of a panel corner;

FIGURE 8 is a view of a hanger used in conjunction with ties for securing the upper ties of the form system to the finished concrete wall;

FIGURE 9 is a plan view of a locking element for use in the present invention;

FIGURE 10 is an elevational view of the locking device of FIGURE 9;

FIGURE 11 shows panels having bevelled corners joined to form a corner by a locking element of the type shown in FIGURES 9 and 10;

FIGURE 12 shows another locking element;

FIGURES 13A and 13B are elevational views showing the clamping element of FIGURE 12 applied to adjacent panels to form outside and inside corners respectively;

FIGURE 14 is a plan view of another locking element;

FIGURE 15 is a side elevational view of the locking element of FIGURE 14;

FIGURE 16 shows the locking element of FIGURES 14 and 15 applied to a pair of abutting panels;

FIGURE 17 shows a curved panel which can be used interchangeably with the flat panel described above;

FIGURE 18 shows a panel for accommodating large loads;

FIGURE 23 is an enlarged sectional view of the corner of another panel;

FIGURE 24 is an edge view of the panel corner shown in FIGURE 23;

FIGURE 25 shows the corners of four adjacent panels of the type shown in FIGURES 23 and 24 interlocked by another locking element;

FIGURE 26 is a side view of the locking element shown in FIGURE 25;

FIGURE 27 is a sectional view showing the locking together of six adjacent panels with another locking element;

FIGURE 28 shows a locking element employed to lock together adjacent panels for gang forming;

FIGURE 29 shows a simplified locking element similar to that of FIGURES 27 and 28;

FIGURE 30 shows a corner locking element for use in a system employing locking elements of the type shown in FIGURE 29; and FIGURE 31 shows a cone extension.

Figure 1:
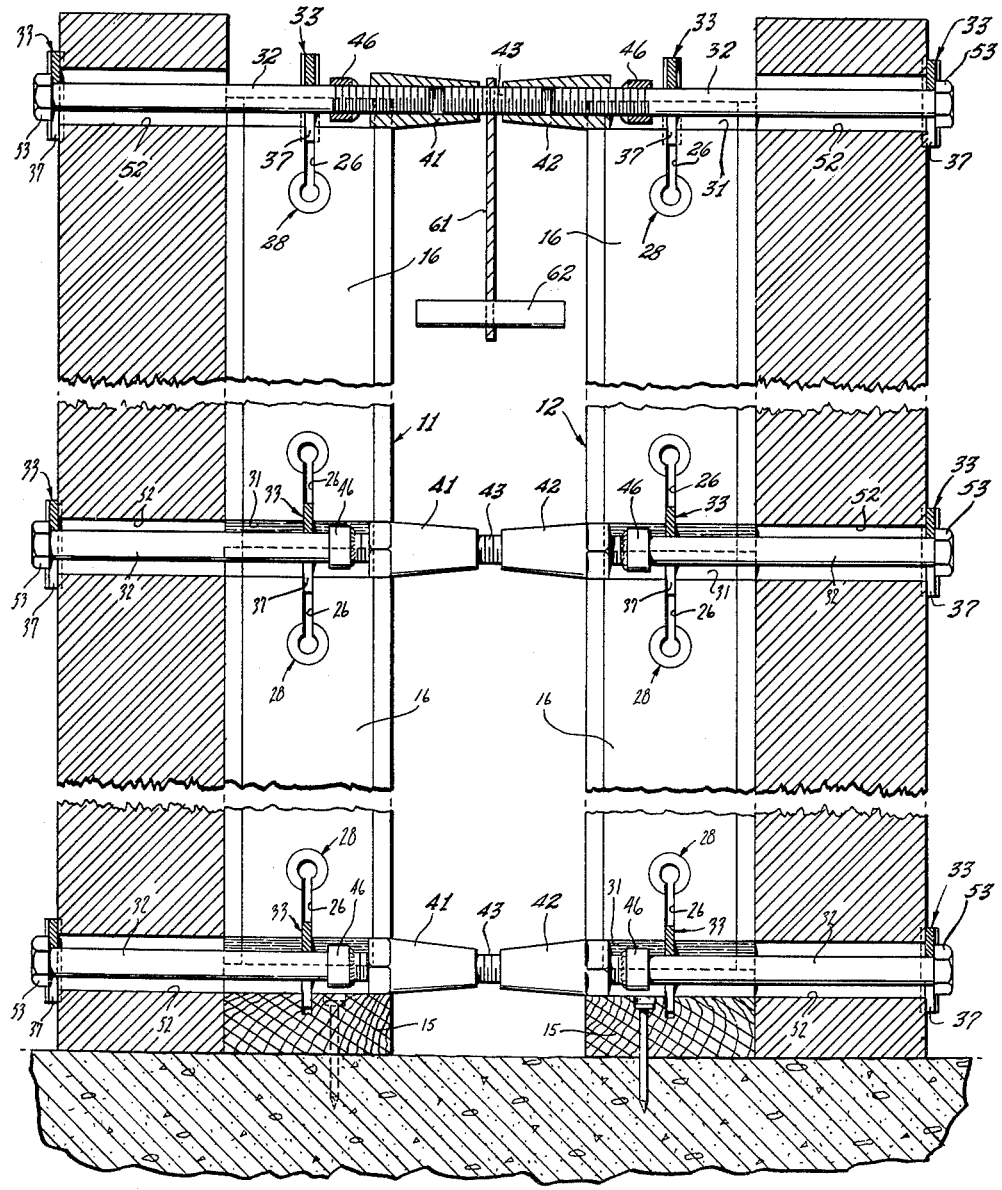
FIGURE 1 is a cross-sectional view of the concrete form system as applied to a forming job.

Generally, the present invention employs light-weight panels formed in modular sizes, which may include variations in width and length, joined to one another and aligned at their corners by an internal locking element. The corner portions of the panels are constructed to receive tie members extending through the panels. The locking element holds the adjacent panels securely together and prevents relative movement between the same. The locking element is adapted to cooperate with extension rods to urge the panel outwardly during a stripping operation.

The panels employed with the present invention may be any of the sandwich-type consisting of two facings or coverings carried by a light-weight core. Preferably, the face members are water-proof and resistant to the deleterious materials in the concrete. The faces may be made of wood, sheet metal, fiberglass or the like. The faces may be formed of plywood, for example, and provided with wearing faces of plastic or the like. The core may be any material such as honeycomb structure, foam plastic or any other suitable light-weight material capable of providing relatively high strength.

One form of panel includes spaced faces of plywood treated with water repellant to protect the surface. Sandwiched therebetween is a cellular type construction which likewise may be made of wood. The side edges of the cells are sealed to the faces. Edging is provided around the entire edge of the panel. The corners of the panel are provided with slots adapted to receive the locking element to secure and align adjacent panels.

Referring to FIGURES 1–4, there is shown a pair of spaced walls 11 and 12 defining a space for receiving and holding concrete. In accordance with the present invention, these walls are made up of a plurality of rectangular panel members 16. Referring more particularly to FIGURE 2, the panel members 16 in the lower row are placed with their side edges in abutment with one another. The upper and lower edges of adjacent tiers or layers are also in abutment with one another. The lower row of panels rests on a notched plate 15. The panels may be staggered as shown by the panels 16' and 16'' to provide improved alignment.

The panels 16 may be of the type shown in FIGURE 5. They include first and second spaced facing members 18 and 19 which are applied to a cellular core 21. The core is made of interlocking strips of material 22 and 23 disposed at an angle with respect to one another and suitably attached. The side edges of the panel include edge members 24. The corners are bevelled 25.

Each corner of the panel includes a pair of open-ended slots 26 having enlarged ends 27 as more clearly illustrated in the enlarged drawing, FIGURES 6 and 7. The enlarged opening may include a slotted bushing 28 to minimize wear of the edge member and to distribute the load over a larger area. This is important especially where the edge member is formed of wood or like soft material. The bushings may be a sleeve 28 having a rim 29 accommodated in the hole formed in the edge member. The open ends of each pair of corner slots meet at the corner to form a single slot with enlarged ends.

Referring now to FIGURE 4, there is shown an enlarged view showing the corners of four abutting panels labelled 16a, 16b, 16c and 16d. The bevelled corners 25 of the abutting panels serve to define a rectangular opening 31 which accommodates a rod 32. A locking element 33 serves to lock together the adjacent abutting panels 16a, 16b, 16c and 16d.

The locking element 33 is shown in more detail in FIGURES 9 and 10. The element includes a web portion 34 with enlarged edge portions 36. It is notched at 37 to receive a rod such as extension rod 32.

The locking element 33 is preferably placed in the slots 26 with the notch 37 opening downwardly over the rod 32, FIGURE 4. The web portions are accommodated in the adjacent slot portions and the enlarged portions register in the enlarged portions 27 of the panels. The locking element 33 thus serves to lock adjacent panels against lateral movement away from one another while also locking the panels for relative movement in a direction perpendicular to the face of the same. If the panels are formed to have a length which is twice their width, a notch and slot may be formed at the center of the long edge. The panels can then be staggered as shown at 16' and 16'', FIGURE 2, to provide better alignment.

Referring now more specifically to FIGURE 1, the walls 11 and 12 are prevented from bulging or moving inwardly by the spacer cones 41 and 42 mounted on tie 43. The small ends of the cones each include threaded sockets for threadably receiving the tie rod 43. The enlarged end of the cones has formed integral therewith a square shank 44 which is accommodated in the rectangular opening 31 defined by the bevelled corners of adjacent panels. The square shank closes the opening to seal the same. The enlarged portion of the spacer cone abuts against the inner surface of the panels and maintains the spacing. The large end of the cones includes a threaded socket for receiving the extension rod 32 previously referred to.

The extension rod 32 has formed thereon a collar 46 which is disposed on the inner side of the locking element 33 and which has an outer diameter greater than the width of the notch 37. Unthreading of the rod 32 causes the sleeve 46 to abut the locking element 33 and urge the element outwardly to, in turn, urge the panel section outwardly and break the same away from the cement. This is more clearly shown in FIGURE 3 which shows the panel wall 11 being urged to the left and away from the concrete 13 by the unthreading of the sleeve 32. The cooperation of the square shank 44 in the opening 31 prevents the cone from rotating.

In order to prevent the walls from bulging outwardly, there is provided upright posts 51 which have a plurality of large holes 52 bored therethrough. These holes are of sufficient diameter to accommodate the head 53 formed on the rod 32 whereby the post 51 may be placed adjacent the walls 11 and 12 after the rods 32 have been threaded into the spacer cones. Following the insertion of the post 51, a locking element 33 is placed between the post 51 and head 53 whereby screwing of the rod into the cone moves the post against the outside surface of the panel members to align the same and prevent outward bulging under the pressure of the concrete placed in the form. The post 51 and locking element 33 are selected so that the width of the web section is equal to that of the post whereby the enlarged portions 36 bear against the edges of the post and serve to prevent rotation of the locking element.

It is, therefore, observed that the same type of locking means may be used to lock together the panels as well as to serve as a washer or abutment for the head 53 to urge the post against the panels.

In general, wall sections are poured to a given height, possibly two or three panels high. The panels are then removed and raised for the pouring of the next level of the wall. In accordance with the present invention, there is provided means for anchoring the upper tie 43 whereby the same is anchored into the concrete wall even though it is not completely buried in the wall. For this purpose, a hanger 61 hangs downwardly from the upper tie member 43 and includes a portion of a rod such as a reinforcing rod 62 which is embedded in the concrete. The various panel sections may then be removed, leaving the upper rod 32 in place in the cones. The panels are then supported by the upper rod 32 for pouring of the next section of the wall.

Referring to FIGURE 2, the panels 16 may be squares, or they may be rectangular larger panels. In all events, it is preferable that the panels be modular in construction so that they may be interchangeably used to form a wall section. Square panels may be applied in any desired orientation. Since the locking means for locking the panels together is an internal locking means, the panels may be placed in any orientation and may be reversed to use either face of the panel, thus doubling the life of the panel in comparison to conventional one-sided panels. Where long panels such as panels 16′ and 16″, FIGURE 2, are employed, it is desirable to provide notches 65 along each of the long edges for accommodating additional tie assemblies. This further permits use of combinations of square panels and rectangular panels such as, for example, the combination of panels 16′ and 16″.

Referring to FIGURE 11, there is shown a modified panel 16 for forming inside and outside corners. In this panel, the side edges are bevelled at 45° angles, and the slots 26′ have enlarged bottoms 27′ formed to coincide and form an elongated slot running at substantially right angles with respect to the face of the bevelled surface whereby to accommodate therein a locking element such as that shown and described above.

In other instances, for inside corners, it may be desirable to employ conventional panel sections but provide a post 66 (FIGURE 13B) adjacent the edges thereof. The upper and lower ends of the post include a right angle notch 67. A locking element such as that shown in FIGURE 12 can be employed to lock the panels together and to the post. The locking element includes an angled web 34′ having enlarged end portions 36′. The post may have edges 68 which are cut away to provide a gap between the cooperating edge of the panel and the post. This facilitates the stripping operation. The use of conventional panels for outside corners can be achieved with an arrangement such as that shown in FIGURE 13A. Interposed between the locking element and the panel edges is an angle iron 69 which can extend between several tiers, if desired, with a back-up member 70.

The locking elements described have substantially cylindrical enlarged portions. It is, of course, apparent that the same locking action may result by employing locking elements which have enlarged rectangular portions or other shapes. Another type of locking element is one such as shown in FIGURES 14 and 15 which is dovetailed in section whereby to fit into dovetailed slots of adjacent panels. Interlocked panels 16 are shown in FIGURE 16.

In certain instances, it may be desirable to form curved walls, and for such purposes, a curved panel such as that shown in FIGURE 17 may be employed. The curved panel includes spaced parallel faces 18′ and 19′ with a suitable core 21 and surrounding edges 24. The corners of the rectangular curved panel have formed thereon suitable locking slots 26 having enlarged bottoms 27 which may cooperate with other panels, either curved or straight, and which are interlocked in the manner previously described.

Where large forces are applied to the panel members, there could be a tendency for the same to bulge in the center. For this purpose, a panel may be formed with convex or cambered faces so that deflection due to pressure on the faces causes the panel to deflect at the center and attain a flat surface. For this purpose, calculations can be made as to the amount of force and the deflection to be expected, and then the camber of the faces suitably selected.

Referring to FIGURE 18, there is shown a sectional view of a rectangular panel which includes cambered or convex faces for accommodating large forces. The panel is formed with first and second faces 71 and 72 which are grooved with grooves 73 running at angles with respect to one another and which have substantially zero depth at the center 74 and which increase in depth at the edges 76. By employing rectangular notched members inserted in the slots for the honeycomb core and gluing the faces to the edges of the various notched members, a panel is formed which will have the requisite convex or cambered surface. It is, of course, apparent that the notched members may be curved to form a thicker center section and flat ungrooved facing members suitably secured thereto as, for example, by nailing and gluing.

To illustrate the flexibility of the system for concrete forming, an example of forming a wall follows. The notched plate 15 is put in place and leveled to thereby accurately define the bottom of the wall. A rod 32 is threaded into a cone and placed in the plate notches. A locking element 33 is then inserted in the slot with its notch 37 accommodating the rod 32. Panel sections are then placed on the notched plate 15 with their slots in registry with the locking elements. The panels may be square or rectangular. However, since the slots are formed on a modular basis, the corners of each of the panels will be locked. When the panels are rectangular, the panels are also locked along the edge intermediate their ends.

Additional panel sections 16 are placed on top of the first tier, after first placing the rod 32 into a corresponding cone and threading the same into the cone and inserting a locking member. The panels are then locked. After one wall has been erected and aligned, reinforced rods are put in place adjacent the face of the wall. Subsequently, tie rods 43 and additional cones 42 are inserted thereon and threaded down to a suitable stop whereby the thickness of the wall is determined by the distance between the faces of the enlarged portions. Subsequently, the opposite wall is erected. This wall is automatically aligned. Thus, it is seen that these are relatively simple steps to be followed in the construction of a concrete form wall with only one wall requiring any alignment, and this alignment being relatively minor because of the self-aligning characteristics of the relatively thick panel members which are locked to one another.

After the concrete has been poured and it has set up, the extension rods 32 are rotated to unscrew the same from the cones. When the collar 46 abuts the locking element 33, it acts as a screw jack to force the associated panels outwardly and break the same away from the concrete. Large forces can be generated by this action.

If, for any reason, it is desired to provide additional tie assemblies, a hole may be cut in the panel. To assure that the hole is sealed, a cone extension 78, FIGURE 31, may be employed. The enlarged end of the cone extension is larger than the hole and when it is in abutment with the panel, it will serve to seal the same. The cone extension is shaped to define an opening which is in the form of a socket which receives the square shank of the associated cone at one end. To remove the cone 42, a square tool is inserted into the other end of the socket of the cone extension. In forming a tie assembly, the extension rod 32 can easily pass through the shaped opening of the cone extension to be threaded into the end of the cone.

In certain instances, it is desirable to move a plurality of assembled panel sections as, for example, by lifting the assembled group to a new position to construct the next portion of a wall or the like. For this purpose, the locking element should securely lock to the corner of adjacent panels so that upon lifting movement of an upper panel, the lower panel will also be lifted.

Figure 19:
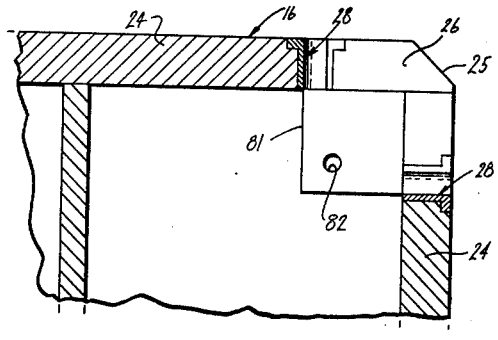
FIGURE 19 is an enlarged sectional view of the corner of a panel suitable for receiving different types of locking elements.
Figure 20:
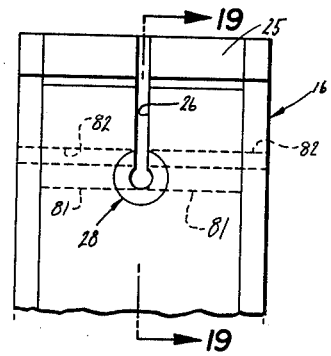
FIGURE 20 is an edge view of the corner shown in FIGURE 19.
Figure 21:
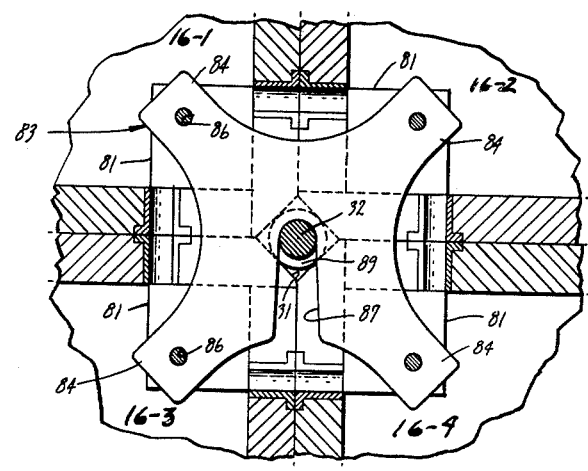
FIGURE 21 is a sectional view showing the corners of four adjacent panels locked together by another corner locking element.

Referring more particularly to FIGURE 19, there is shown a panel 16 which includes corner slots 26 and end bushings 28 in the manner previously described. However, in each corner of the panel there is provided spaced blocks 81 which define therebetween a slot. The blocks may be predrilled as shown at 82 for receiving a pin which may be extended inwardly from either face of the panel.

To permanently assemble a plurality of adjacent panels such as the four panels 16–1, 16–2, 16–3 and 16–4, a locking element such as the locking element 83 which has a plurality of outwardly extending body portions 84 is employed. The locking element is inserted into the slot. It includes holes 86 which are adapted to register with the holes formed in the blocks 81. Subsequently, a pin is inserted through the panel and engages the holes 86 to thereby lock the locking element 83 to the associated panel. The locking element 83 includes a notch 87 which is adapted to receive the extension rod. The edges of the notch are engaged by the collar 89 for stripping in the manner previously described and shown in FIGURE 22.

Figure 22:
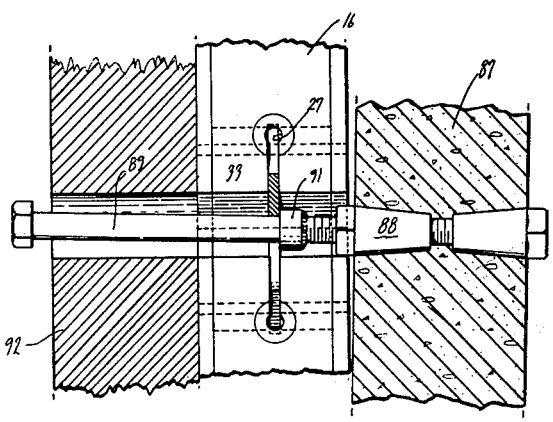
FIGURE 22 shows a stripping operation employing the assembly of FIGURE 21.

Referring more specifically to FIGURE 22, there is shown a concrete structure 87 including a cone 88 and an extension rod 89 having a collar 91 as previously described. The extension rod extends through the upright 92. The panel 16 is urged outwardly away from the wall for stripping the same by unthreading the rod 89 so that collar 91 abuts the edge of the notch. Once the wall has been stripped away, the panels may be moved outwardly whereby the head of the extension rod passes through the opening 92. The locking element is removed along with the extension rod.

Referring now to FIGURES 23–25, there is shown a panel 16 which includes a block 101 in each of its corners. The panel and block are slotted. A pin 102 is permanently inserted between the faces of the panel and bridges the slot formed in the block 101. A locking element 103 similar to the locking element just described is employed. Such an element is shown in FIGURE 25. The element includes notches on its four arms 104. The element includes an extension 105 which extends outwardly over the associated extension rod 106. To assemble panels, the locking element is placed in registry with the corner slots of four adjacent panels. It is then rotated counter-clockwise as viewed in the figure by operating on the extension 105 to cause the notches to engage the various spaced pins 102.

Referring to FIGURE 27, there are shown six panels of various sizes assembled for gang forming. The lower tier of panels includes panels 111, 112 and 113, and the upper tier of panels includes panels 116, 117 and 118.

The panels each include slotted corner blocks 121 having pins 122 extending therethrough and bridging the slot. The long rectangular panels include additionally an intermediate slotted block 123 with pins 124 extending therethrough and bridging the slot.

A flat locking element 126 is employed to tie together the various panels, as is seen in the figure. The locking element 126 is provided with corner notches 127 for engaging equally spaced pins such as would be locked when four adjacent corners of four panels are in abutment. There is provided additionally a locking notch 128 and a curved notch 129.

The locking notch 128 may be used as shown in the assembly of panels 112, 113 and 118. The arrangement is such that the panels are locked to one another so that the vertical forces cannot separate the panels. The locking element is first placed in cooperation with panels 112 and 113. The upper panel is then dropped down onto the element in registry with the open end of the locking notch 128, and when it is fully seated, the panel is moved to the left, as viewed in the figure. This serves to engage the associated pins with the locking notch 128 and the associated corner notch 127.

The curved notch 129 may be employed, as shown, in the joining together of panels 112, 117 and 118. The locking element is inserted in the panel 112 and rotated clockwise, as viewed in the figure and as indicated by the dotted outline. Panel 117 is then put in place and the locking element rotated counter-clockwise whereby the corner notch 127 engages the associated corner pin of the panel 117 to lock together the panels 112 and 117. Subsequently, the panel 118 is slid in place with its corner pin engaging the other corner notch 127. The central opening formed in the locking plate includes an enlarged portion 130 which permits rotation of the locking element and a smaller portion which is adapted to fit over the extension rod and abut the shoulder formed on the same for a stripping operation.

The locking together of four adjacent panels is shown in locking together of the four corners of panels 111, 112, 116 and 117. It is observed that only the corner notches are employed in this arrangement. There will be presently described a locking element which includes only corner notches. The locking element includes a notch 135 intermediate the edges. This notch is adapted to fit onto the spaced pins in an intermediate locking slot when the locking element is used to merely receive the pins of adjacent panels in a vertical assembly.

In gang forming, it may be desirable to lock panels together by means of a tie rod. For this purpose, the edges of the panels may include a groove such as the groove shown at 131, FIGURE 23–25 and 27. The grooves of two cooperating panels will form a channel for receiving the tie rod. A tie element 132 may be placed over the extension rod 133 and a clevis 134 arranged to engage the opening 136 formed in the tie element. The clevis threadably receives a tie rod 137 which can be rotated for tightening the assembly. It is apparent that the panels may be tied together in both the vertical and horizontal directions by suitably employing tie rod members.

Referring to FIGURE 5, the panel shown is provided with aligned holes 139 which can receive locking rods if it is desired to lock together panels in this manner. The tie rods could extend through these openings and through a number of adjacent panels and include suitable means for tying or clamping. The use of tie rods in an assembly of this type would also assure that the panels would not slide with respect to one another because of the cooperation of the element with a number of panels.

FIGURE 29 shows a locking element similar to that shown in FIGURE 27 but of simpler construction. The locking element merely includes corner notches 151 for receiving the corner pins of associated panels. In addition, the locking member includes slots 152 which can be employed to receive a clevis for tying together a number of panels for gang forming. The locking element includes an elongated notch so that it may be placed over the tie assembly extension rod.

FIGURE 30 shows a locking element of the type just described for forming corners. The openings 156 are provided for receiving clevises to tie together channels both in the horizontal and vertical directions.

In the embodiments shown in FIGURES 19–27, there is provided a simple means for gang forming whereby the various panels are locked together and can be moved in unison. Furthermore, the locking elements of this type also provide means whereby a panel of given length may be sawn to a shorter length and then a corner slotted. Spaced blocks can be affixed at the corner and then insertion of a pin will provide for tying two panels together.

It is, therefore, noted that there is provided a form system which is easy to erect; requires simple tools (a wrench); requires a minimum of hardware; can be non-destructively dismantled or stripped; can be used alongside conventional forms; is light weight, reusable; and provides substantial labor and material savings.

I claim:

1. In a concrete form system of the character described in which spaced walls have tie rod assemblies extending across and cooperating with the spaced walls, the combination of at least two panels abutting along one edge, each panel comprising a rectangular body having external first and second spaced, substantially parallel faces and a corner slot at each corner between said faces, the slots of abutting panels extending towards one another and in registered relation, a locking element including a generally flat body disposed in said slots, means on the panels positioned at the slots to cooperate with said panels and said locking element to lock the panels to one another via the locking element, and said panels being cut-out at each of said corners for accommodating a tie rod assembly extending between the spaced walls and beyond said panels.

2. The combination as in claim 1 wherein said means cooperating between the panels and the locking element comprises a pin adapted to form an interlocking engagement with said locking element and each of said panels.

3. The combination as in claim 2 wherein the body of said element is provided with spaced notches for interlocking engagement with said pins.

4. A device for maintaining spaced walls of a concrete form against movement with respect to one another comprising a tie rod having threaded ends, a pair of spacer cones each having at its narrow end a threaded socket for receiving the adjacent end of said tie rod, a threaded socket formed in the enlarged end of said cones, an extension rod having one end threadably received by the threaded socket, said extension rod including means forming a shoulder, and a bearing element adjacent said shoulder arranged to be in engagement with said wall whereby unthreading of said rod causes the shoulder to engage said element to move the wall outwardly from the concrete receiving space.

5. In a concrete form including spaced walls, at least one of said walls including the combination of at least two panels in abutment along one edge, each panel comprising a rectangular body having first and second spaced external faces and having a corner slot, slots of mating panels extending towards one another to define in combination a mated slot disposed equidistant entirely between said faces, a locking element including a flat body disposed in said mated slot, a tie rod having threaded ends, a pair of spacer cones each having at its narrow end a threaded socket for receiving the adjacent end of said tie rod, the large end of said cone bearing against the opposed inner surface of said spaced panels to maintain their spacing and provided with a threaded socket, an extension rod having one end threadably received by the threaded socket and extending through said locking element, and means carried by said rod and cooperating with said locking element whereby unthreading of said rod from said socket serves to engage said locking element and move the corresponding wall outwardly.

6. A concrete form as in claim 5 in which said cooperating means includes a slot formed in the locking element and a shoulder formed on the extension rod.

7. A concrete wall form including a pair of spaced walls, at least one of said walls including a combination of at least two panels in edgewise abutment along one edge, each panel including a rectangular body having first and second spaced faces, a corner slot formed in each of said panels, the slots of mating panels extending towards one another to define in combination a mated slot, the corners of said panels being cut away to define in combination with the corner of an adjacent panel a notch, a locking member disposed to cooperate with the slots of mating panels, a tie rod having a threaded end, a pair of spacer cones each including an internally threaded socket at their small ends threaded to the ends of said tie rod, the large end of said cones abutting against the face of said spaced walls, a shank for receiving a wrench formed integral with the large end of said cone and accommodated in said panel notch, a threaded socket formed in the large end, and an extension rod threaded into said socket, said locking member adapted to receive said rod, said rod including a shoulder intermediate the ends thereof and disposed adjacent and on the inside of said locking element, said sleeve serving to abut the locking member and urge the panel sections outwardly as the rod in unthreaded from the corresponding socket.

8. In a concrete form including spaced walls, at least one of said walls including the combination of at least two panels in edgewise abutment along one edge, each panel comprising a rectangular body having first and second spaced faces, a corner slot formed in each of said panels, slots of mating panels extending towards one another to define in combination a mated slot disposed entirely between said faces, a locking element including a flat body disposed in said mated slot, means cooperating between each of said panels and said locking element serving to lock the panels to one another via the locking element, a tie rod having threaded ends, a pair of spacer cones each having at its narrow end a threaded socket for receiving the adjacent end of said tie rod, the large end of said cone bearing against the opposed inner surface of said spaced panels to maintain their spacing, a threaded socket formed in the large end of each of said cones, an extension rod having one end threadably received by the threaded socket and extending through said locking element, and means on said rod cooperating between said locking element and rod whereby unthreading of said rod from said socket serves to engage said means with said locking element and move the corresponding wall outwardly.

9. The combination as in claim 8 wherein said means cooperating between the panels and the locking element comprises a pin in each of said slots adapted to interlockingly engage said locking element.

10. The combination as in claim 9 wherein the body of said locking element is provided with spaced notches for interlocking engagement with said pins.

11. In a concrete form system wherein opposing spaced walls are releasably connected together by transversely extending tie rod assemblies including a part of substantially polygonal cross-section, each wall including a plurality of panels arranged in coplanar relation and with the peripheral side and a corner of one panel abutting an adjacent peripheral side and corner respectively of another panel, each panel comprising a rectangular body defined between external, substantially parallel faces, the corners of said body having portions providing when adjoining panels are in abutting relationship a recess for the reception of said tie rod assemblies in operative position with the panel and having an opening with substantially polygonal sides to engage said part whereby rotation of said part relative to the body will be prevented when said part is operatively engaged within said opening, a substantially flat locking plate arranged for mounting on one of said tie rod assemblies to extend transversely thereof, said panel at each of said corners being formed with a slot opening into said recess and extending substantially parallel to and equidistant between said faces for reception of a portion of said plate when the same is mounted on said assembly, said plate operatively engaging at least one of said sides to thereby hold the panels against lateral movement relative to each other, and means on said panel positioned at said slot to interlock with said plate to retain adjoining panels from separation in the plane of the panels at said abutting peripheral sides.

12. In a concrete form system of the character described in which spaced walls have tie rod assemblies extending across and cooperating between the spaced walls, the combination of at least two panels abutting along one edge, each panel comprising a rectangular body having external first and second spaced, substantially parallel faces and provided with a slot at a corner of each of said panels positioned between said faces, the slots of abutting panels extending towards one another and in registered relation to define a common recess, a locking element including a generally flat body disposed in said recess and serving to retain said panels against relative lateral displacement, and means on the panels interengaging with said locking element serving to lock the panels to one another, said panels at said corner slots having portions defining a recess communicating with said slots and accommodating one of said tie-rod assemblies in operative position therein.

13. A device for maintaining opposed walls of a concrete form in spaced relation for reception of concrete therebetween and each having a transverse opening in alignment with the opening in the other wall, comprising a tie-rod having threaded ends, spacer cones having a threaded socket at the smaller ends engaged by the threaded ends of the rod, said cones also having a threaded socket at the larger end, extension rods extending through said openings and having threaded ends received in the sockets at the larger ends of the spacers, means on the spacers operably engageable with the walls for retaining the spacers against rotation relative thereto, a thrust receiving element arranged for positioning on each of the walls and against movement longitudinally of said openings, and means on said extension rods positioned to engage said thrust receiving means and operating to move said walls away from each other on rotation of the extension rods in the sockets.

14. In a concrete form structure having opposing spaced walls with an opening extending through at least one of the walls in a direction normal thereto, a tie rod assembly securing said walls together in selectively spaced relation and comprising a tie-rod arranged for positioning between said walls and having a threaded portion, a spacer having a threaded portion complementing and engaging the threaded portion of the rod, an extension rod extending through said opening, cooperating threaded portions on the extension rod and spacer, and cooperating interengaging means on the extension rod and said wall operative on rotation of the rod extension relative to the spacer to move the wall outwardly from the other wall.

References Cited by the Examiner
UNITED STATES PATENTS

| | | | |
|---|---|---|---|
| 652,051 | 6/00 | Streifler | 50—440 |
| 779,288 | 1/05 | Lane | 25—131 |
| 839,819 | 1/07 | Delhorbe | 25—131 |
| 1,297,906 | 3/19 | Quass | 50—443 |
| 1,695,553 | 12/28 | Jones et al. | 50—440 |
| 1,723,631 | 8/29 | Pollock et al. | 25—131 |
| 1,937,109 | 11/33 | Colt | 25—131 |

MICHAEL V. BRINDISI, *Primary Examiner.*

ROBERT F. WHITE, *Examiner.*